(12) United States Patent
Yu et al.

(10) Patent No.: US 12,126,856 B2
(45) Date of Patent: Oct. 22, 2024

(54) REMOTE ASSISTANCE METHOD AND SYSTEM, AND ELECTRONIC DEVICE

(71) Applicant: Huawei Technologies Co., Ltd., Shenzhen (CN)

(72) Inventors: Dongyang Yu, Shenzhen (CN); Jinghua Sima, Shenzhen (CN); Haibo Zhang, Dubai (AE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1 day.

(21) Appl. No.: 17/782,016

(22) PCT Filed: Oct. 22, 2020

(86) PCT No.: PCT/CN2020/122844
§ 371 (c)(1),
(2) Date: Jun. 2, 2022

(87) PCT Pub. No.: WO2021/109745
PCT Pub. Date: Jun. 10, 2021

(65) Prior Publication Data
US 2023/0008199 A1  Jan. 12, 2023

(30) Foreign Application Priority Data
Dec. 4, 2019  (CN) .......................... 201911230080.9

(51) Int. Cl.
*H04N 21/436* (2011.01)
*H04N 7/14* (2006.01)
*H04N 21/414* (2011.01)

(52) U.S. Cl.
CPC ....... *H04N 21/43615* (2013.01); *H04N 7/141* (2013.01); *H04N 21/41407* (2013.01); *H04N 2007/145* (2013.01)

(58) Field of Classification Search
None
See application file for complete search history.

(56) References Cited

U.S. PATENT DOCUMENTS

| 2015/0061841 | A1 | 3/2015 | Lee et al. |
| 2018/0234479 | A1 | 8/2018 | Lilienthal et al. |
| 2019/0208284 | A1 | 7/2019 | Guo et al. |

(Continued)

FOREIGN PATENT DOCUMENTS

| CN | 102664944 A |   | 9/2012 |            |
| CN | 106254462 A | * | 12/2016 | ......... H04L 63/0428 |
| CN | 106502118 A |   | 3/2017 |            |

(Continued)

*Primary Examiner* — Omar S Parra

(57) ABSTRACT

A method, performed by a first terminal in a video call process between the first terminal and a second terminal, includes sending an image including a target device to a server, receiving device information corresponding to the target device sent by the server, virtualizing an operation interface based on the received device information, and displaying the operation interface on a current video call screen, where the operation interface is an operation interface of a control panel or a remote control of the target device, and displaying, on the current video call screen based on data from the second terminal, one or more operations performed on the operation interface by a user of the second terminal on the second terminal.

20 Claims, 8 Drawing Sheets

(56) References Cited

U.S. PATENT DOCUMENTS

2020/0143593 A1* 5/2020 Rudman ................ G06T 19/006
2020/0195518 A1* 6/2020 Sugaya .................. G16Y 40/35

FOREIGN PATENT DOCUMENTS

| CN | 107547554 A | | 1/2018 | |
|----|-------------|---|--------|---|
| CN | 107817701 A | * | 3/2018 | ............ G05B 19/04 |
| CN | 108415635 A | | 8/2018 | |
| CN | 108931924 A | | 12/2018 | |
| CN | 208207534 U | | 12/2018 | |
| CN | 109451141 A | | 3/2019 | |
| CN | 109541948 A | | 3/2019 | |
| CN | 109587536 A | | 4/2019 | |

* cited by examiner

REMOTE ASSISTANCE METHOD AND SYSTEM, AND ELECTRONIC DEVICE

CROSS-REFERENCE TO RELATED APPLICATIONS

This is a U.S. National Stage of International Patent Application No. PCT/CN2020/122844 filed on Oct. 22, 2020, which claims priority to Chinese Patent Application No. 201911230080.9 filed on Dec. 4, 2019. Both of the aforementioned applications are hereby incorporated by reference in their entireties.

TECHNICAL FIELD

The present invention relates to the field of augmented reality technologies, and in particular, to a remote assistance method and system, and an electronic device.

BACKGROUND

With rapid development of augmented reality (augmented reality, AR) technologies, the AR technologies are more widely used in fields such as entertainment, education, commerce, tourism, communication, and games, From fun applications such as MYOTee and AR games at the beginning to AR measurement, AR home, AR communication, and the like, AR applications have been more closely integrated with mobile terminals, and provide consumers with better experience on the combination of virtual and reality.

In the prior art, a user may use a mobile phone to connect, manage, and control a household appliance, so that a state of the household appliance can be controlled by one tap, and control and management can be easily performed at home or outside. However, if the user does not know how to use a function of the appliance, or if the user does not know how to operate the appliance, or in other cases, the user can only obtain assistance generally through a call or a video call to learn how to operate, but if the operation is complicated and may not be easy to understand, or if the user requiring assistance has specific difficulties such as vision and hearing impairment, this type of guidance does not provide effective assistance.

SUMMARY

To overcome the foregoing problem, embodiments of this application provide a remote assistance method and system, and an electronic device.

To achieve the foregoing objective, the following technical solutions are used in the embodiments of this application:

According to a first aspect, this application provides a remote assistance method. The method is performed by a first terminal in a video call process between the first terminal and a second terminal, and includes: sending an image including a target device to a server; receiving device information corresponding to the target device sent by the server; virtualizing an operation interface based on the received device information, and displaying the operation interface on a current video call screen, where the operation interface is an operation interface of a control panel or a remote control of the target device; and displaying, on the current video call screen based on data from the second terminal, one or more operations performed on the operation interface by a user of the second terminal on the second terminal.

In this embodiment of this application, a video stream including the target device is obtained, and the device information related to the device is obtained based on the video stream. Then, the virtual control interface is presented in a video of the first terminal by using an AR technology, so that the first terminal 20 obtains, by parsing based on operation information sent by the second terminal, operation actions of performing an operation on the operation interface, and then the first terminal restores these operation actions on the video screen based on the operation information. By watching the restored operation actions, a user corresponding to the first terminal learns a method for operating and controlling the target device, and can perform an operation directly on the control panel on the first terminal or on a real remote control device. An assisted user can see, on a terminal of the user, a specific operation performed on the real control panel or remote control. This is very intuitive, and improves efficiency of communication between the two parties.

In another possible implementation, the method further includes: binding the operation interface to the target device. This prevents the terminal from still using a virtual operation interface of a previous device after the device in the video stream changes.

In another possible implementation, the displaying the operation interface on a current video call screen includes: displaying the operation interface on or near the target device on the current video call screen, where the operation interface is the operation interface of the remote control of the target device; or overlaying or replacing the control panel of the target device on the current video call screen with the operation interface, where the operation interface is the operation interface of the control panel of the target device.

In another possible implementation, the method further includes: receiving at least one first operation sent by the second terminal, and sending a control instruction to the target device, where the control instruction is used to control the target device.

In this embodiment of this application, a control party performs an operation on a virtual interface in a video, and then sends a control instruction corresponding to the operation to the first terminal. When the first terminal has a function of directly controlling the target device, the first terminal directly sends the control instruction to the target device. In this way, an assisting party directly controls the target device, thereby helping the assisted party more effectively.

In another possible implementation, the method further includes: receiving at least one second operation performed by the user on the operation interface; determining a visual effect corresponding to the at least one second operation, and displaying the visual effect on the current video call screen; and synchronizing the visual effect to the second terminal.

In this embodiment of this application, after the assisted party performs an operation on a virtual interface in a video, an effect corresponding to the operation is sent to the terminal of the assisting party, so that the assisting party knows whether the operation of the assisted party is correct.

In another possible implementation, the method further includes: determining, based on the received at least one second operation, a control instruction corresponding to the at least one second operation, and sending the control instruction to the target device, where the control instruction is used to control the target device.

According to a second aspect, an embodiment of this application provides a terminal device, including a transceiver, a processor, and a memory. The transceiver is configured to receive and send data. The memory stores one or more programs, the one or more programs include an instruction, and when the instruction is executed by the processor, the electronic device is enabled to perform the method according to the possible implementations of the first aspect.

According to a third aspect, an embodiment of this application provides a remote assistance method. The method is performed by a second terminal in a video call process between the second terminal and a first terminal. The method includes: receiving device information of a target device, where the target device is a device displayed on a current video call screen; virtualizing an operation interface based on the received device information, and displaying the operation interface on the current video call screen, where the operation interface is an operation interface of a control panel or a remote control of the target device; receiving at least one third operation performed by a user on the operation interface on the current video call screen; and displaying a visual effect corresponding to one or more operations performed on the operation interface, and synchronizing the visual effect to the first terminal.

In this embodiment of this application, the video call screen including the virtual operation interface is presented on the second terminal. A user corresponding to the second terminal performs an operation on the virtual operation interface on the second terminal. The first terminal synchronously presents the operation performed by the user on the virtual operation interface, to assist a user corresponding to the first terminal in controlling the target device.

In another possible implementation, the method further includes: binding the operation interface to the target device.

In another possible implementation, the displaying the operation interface on the current video call screen includes: displaying the operation interface on or around the target device on the current video call screen, where the operation interface is a control interface of the remote control of the target device; or overlaying or replacing the control panel of the target device on the current video call screen with the operation interface, where the operation interface is a control interface of the control panel of the target device.

In another possible implementation, the method further includes: displaying, on the current video call screen based on data from the first terminal, one or more operations performed on the virtual operation interface by a user of the first terminal on the first terminal.

According to a fourth aspect, an embodiment of this application provides a terminal device, including a transceiver, a processor, and a memory. The transceiver is configured to receive and send data. The memory stores one or more programs, the one or more programs include an instruction, and when the instruction is executed by the processor, the electronic device is enabled to perform the method according to the possible implementations of the third aspect.

According to a fifth aspect, an embodiment of this application provides a remote assistance system, including a target device that needs to be controlled, a cloud server, a terminal device performing the method according to the possible implementations of the first aspect, and a terminal device performing the method according to the possible implementations of the third aspect.

According to a sixth aspect, an embodiment of this application provides a readable storage medium, configured to store an instruction. When the instruction is executed, the method according to the possible implementations of the first aspect and the method according to the possible implementations of the third aspect are implemented.

According to a seventh aspect, an embodiment of this application provides a computer program device including an instruction. When the computer program device runs on a terminal, the terminal is enabled to perform the method according to the possible implementations of the first aspect and the method according to the possible implementations of the third aspect.

BRIEF DESCRIPTION OF DRAWINGS

The following briefly describes the accompanying drawings required for describing the embodiments or the prior art.

DESCRIPTION OF EMBODIMENTS

The following describes the technical solutions in the embodiments of this application with reference to the accompanying drawings in the embodiments of this application.

Figure 1:
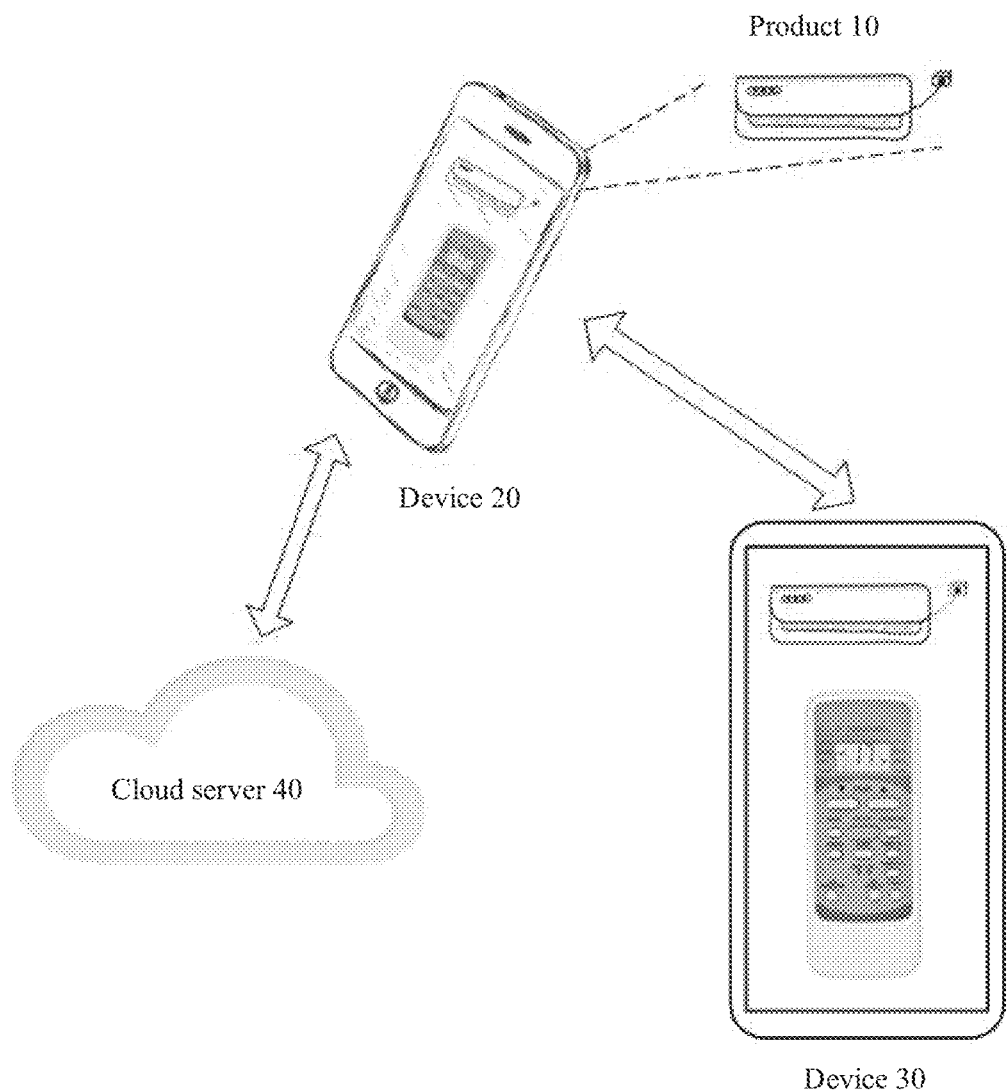
FIG. 1 is a schematic structural diagram of a remote assistance system according to an embodiment of this application.

FIG. 1 is a schematic structural diagram of a remote assistance system according to an embodiment of this application. As shown in FIG. 1, the system includes a target device 10, a terminal 20, a terminal 30, and a cloud server 40.

The target device 10 in this embodiment of this application is a device (target device) on which a control operation needs to be performed, and includes but is not limited to an electronic device such as an air conditioner, a television, a mobile phone, or a computer, a mechanical device, a vehicle, or another type of device, or is a remote control of the foregoing device. In this embodiment of this application, an air conditioner is used as an example to describe the technical solution.

The terminal 20 and the terminal 30 in this embodiment of this application include but are not limited to electronic devices such as mobile phones, tablets, or notebooks.

In this embodiment of this application, in a video call process between the terminal 20 and the terminal 30, the terminal 20 photographs the target device 10 by using a camera, to obtain an image of the target device 10, and generate a video stream including the image of the target device 10. The terminal 20 sends the obtained video stream including the image of the target device 10 to the terminal 30, and also sends the video stream to the cloud server 40. The cloud server 40 identifies the target device 10 in the video stream in real time, and based on the identified target device 10, matches a data model and controllable configuration file data that are corresponding to the target device 10, and then sends the data model and the controllable configuration tile data that are corresponding to the target device 10 to the terminal 20 and the terminal 30. The terminal 20 and the terminal 30 virtualize an operation interface in a video based on the received data model. The operation interface is an image corresponding to a real remote control device or control panel that controls the target device 10, and is presented at a position such as a position around or right above the target device 10 in the video. In addition, based on the received controllable configuration file, a button, a knob, and the like on the virtualized operation interface are associated with corresponding control instructions, so that when a user operates a control such as the button or the knob on the operation interface, the terminal 20 can determine a control instruction corresponding to each operation.

In a specific example, as shown in FIG. 1, after photographing an air conditioner, the terminal 20 sends a video including the air conditioner or an image of the air conditioner to the server, and the server identifies a brand and a model of the air conditioner through, for example, artificial intelligence (artificial intelligence, AI), obtains a two-dimensional or three-dimensional image model of a remote control corresponding to the air conditioner of the brand and the model, and obtains a controllable configuration file of an instruction corresponding to each button on the remote control. For example, a controllable configuration file corresponding to an "ON/OFF" button is that an instruction for turning off or turning on the air conditioner is executed after the "ON/OFF" button is pressed. Then, the server sends both the remote control model and the controllable configuration file to the terminal 20. After receiving the remote control model and the controllable configuration file, the terminal 20 virtualizes a corresponding remote control image, and displays the remote control image on a current video screen. The video screen with the virtual remote control image may be synchronized to the terminal 30 by using an audio and video synchronization technology. Certainly, the server may alternatively send the remote control model and the controllable configuration file to the terminal 30. However, the former is simpler and more economical during implementation. When the user operates a virtual button on the virtual remote control image, for example, operates the virtual button on the terminal 30, the terminal 30 determines an instruction corresponding to the virtual button (different operations on a same button may correspond to different instructions, for example, a touch and hold operation and a short tap operation correspond to different instructions), sends information corresponding to the instruction, such as all operation position, an operation type, and a timestamp, to the peer terminal 20, and presents a visual effect corresponding to the operation on the virtual remote control image on the current video screen of the terminal 30. For example, the button is recessed downward as the user presses, and is recovered as the user raises the hand. For example, after a touch button is pressed, there is a corresponding indicator, or LCD display content changes. The visual effect may be included in the controllable configuration file. The terminal determines a corresponding visual effect based on a current user operation and the controllable configuration file. The visual effect is also synchronized to the terminal 20. In this way, the user of the terminal 20 can intuitively see how to control the remote control. Based on the received instruction, the terminal 20 may further send a control instruction for controlling the target device, to implement remote control on the target device.

It should be noted that if the terminal 20 does not have a function of controlling the target device 10 (for example, the terminal 20 does not have an infrared emission function, or is not connected to the target device), or if the user does not need to use the terminal 20 to directly control the target device 10, or in other cases, the server 40 may not send the controllable configuration file, or the sent controllable configuration file does not include a control instruction (an instruction for directly controlling the target device). Based on an operation that is displayed on the terminal 20 and that is performed by a remote assisting party on the remote control model, the user can learn an operation of controlling the target device 10, and can directly perform an operation on the target device 10 or on a physical remote control, to control the target device 10.

When the user performs an operation on the virtual operation interface on the terminal 20 or the terminal 30, the terminal 20 or the terminal 30 records operation information in an operation process, for example, information such as a coordinate point, a timestamp, a quantity of times, and duration, determines a corresponding visual effect, presents the visual effect on the current video call screen, and synchronizes the visual effect to the peer end of the video call. In a possible embodiment, when user A corresponding to the terminal 20 does not know how to operate the air conditioner, user B corresponding to the terminal 30 assists user A in controlling the air conditioner, and user A informs, by using an audio and a video, user B that user A wants to "turn on the air conditioner and adjust a temperature to 21 degrees (assuming that a startup temperature is 17 degrees)". User B performs an operation on the virtual "ON/OFF" button of the operation interface of the virtual remote control displayed on the terminal 30, to turn on the air conditioner. In this case, the terminal 30 records operation information such as a coordinate point of a sliding operation, an operation time, and a quantity of taps in the operation process. Then, user B performs an operation on a virtual temperature button "+F" of the virtual remote control displayed on the terminal 30, to adjust the temperature to "21 degrees" by tapping four times. In this case, the terminal 30 records operation information such as a coordinate point of a sliding operation, an operation time, and a quantity of taps in the operation process. In a user operation process, the terminal 20 determines and presents visual effects of these operations based on received input. For example, a button of the virtual remote control is pressed, and a display window displays a corresponding icon, number, and the like. These visual effects are displayed on a currently ongoing video call screen and synchronized to the peer end of the video call. The terminal 20 presents the visual effects of the user operations, to inform, in an intuitive manner, user A of how to perform an operation on the terminal 20, so as to perform an operation on the air conditioner to turn on the air conditioner and adjust the temperature to 21 degrees.

Figure 2:
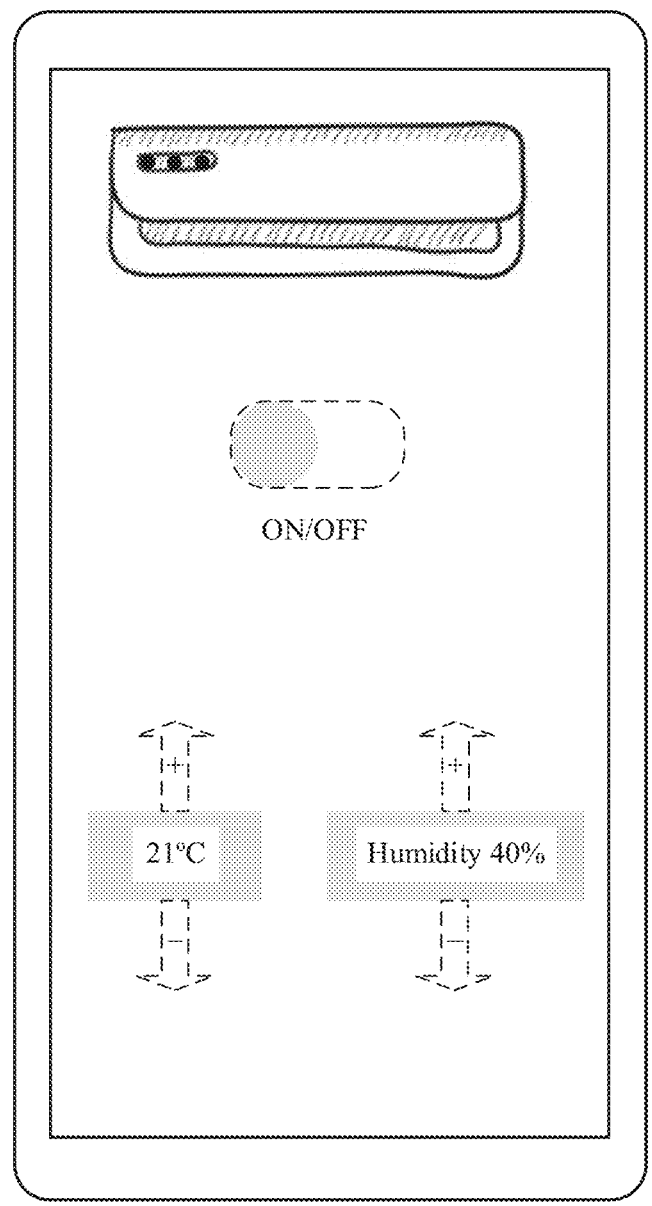
FIG. 2 is a schematic diagram of a virtual operation interface displayed on a terminal according to an embodiment of this application.

FIG. 2 is a schematic diagram of a virtual operation interface displayed on a terminal according to an embodiment of this application.

In a possible embodiment, a terminal 20 and a terminal 30 are performing a video call by using a mobile phone, and a user of the terminal 20 points a camera of the mobile phone to an air conditioner. In this way, an image of the air conditioner is displayed on a video call screen, as shown in FIG. 2. The terminal 20 has a transmission function such as infrared, Wi-Fi, Bluetooth, or data traffic, or has a function of directly controlling a target device. After receiving a data model (and a controllable configuration file) corresponding to the air conditioner, the terminal 20 virtualizes a virtual control interface, and the control interface includes some virtual buttons such as a virtual "ON/OFF" button, a virtual temperature button, and a virtual humidity button. The virtual control interface is presented near the air conditioner in a video stream. After user B of the terminal 30 operates a virtual button on the virtual control interface, the terminal 30 presents visual effects of these operations on the interface of the terminal 30, synchronizes the visual effects to the peer end of the video call, namely the terminal 20, and also sends obtained control information corresponding to the operation information to the terminal 20. User A of the terminal 20 can intuitively learn, by watching, how to perform an operation on the control interface. After user A performs an operation on the virtual control interface of the terminal 20, the terminal 20 sends a control instruction corresponding to each virtual button to the air conditioner in a transmission mode such as infrared, Wi-Fi, Bluetooth, or data traffic.

Figure 3:
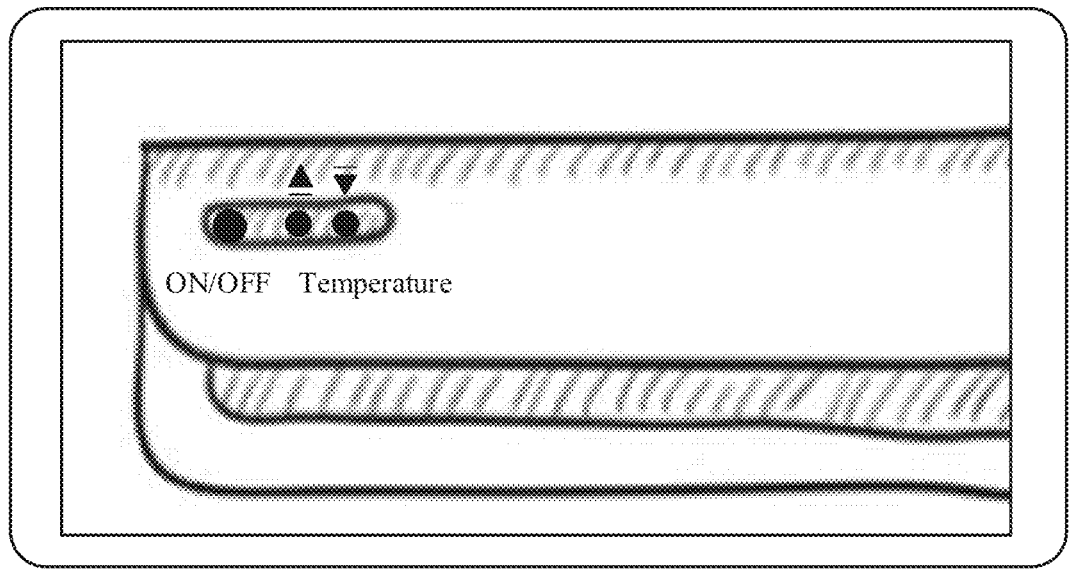
FIG. 3 is a schematic diagram of a virtual operation interface displayed on a terminal according to an embodiment of this application.

FIG. 3 is a schematic diagram of a virtual operation interface displayed on a terminal according to an embodiment of this application.

In a possible embodiment, as shown in FIG. 3, after receiving a data model corresponding to an air conditioner, a terminal 20 constructs a three-dimensional structural diagram of a virtual air conditioner of the same size as the air conditioner in a video stream, and then overlays or replaces the air conditioner in the video stream with the three-dimensional structural diagram of the virtual air conditioner. The virtual air conditioner is synchronized to a terminal 30 by using an audio and video call synchronization technology. When user B performs an operation on an operable button on the three-dimensional structural diagram of the virtual air conditioner on the terminal 30, the terminal 30 synchronizes, to the terminal 20 in real time, a visual effect corresponding to the operation on the three-dimensional structural diagram of the virtual air conditioner on a current video screen. The terminal 20 presents the visual effect. By watching these restored operation actions, user A can learn a method for operating and controlling the air conditioner, and then directly perform an operation on a control panel of the air conditioner to control the air conditioner.

After receiving the operation performed by the user on the virtual operation interface, the terminal needs to determine an operation object based on coordinates, and determine a display effect based on information such as a time, pressure, a direction, and a distance, and a controllable configuration file. For example, if the user presses a touch button or a virtual button, a cursor or a shadow is displayed on the button to indicate that the user selects the button, or an animation effect such as a light circle or a special symbol is displayed on the button to indicate a corresponding operation such as touching and holding the button or tapping the button. There is a correspondence among operation information, an operation object, and a display effect, and the correspondence needs to be prestored locally or in the cloud. For example, the correspondence may be a controllable configuration file, or may be obtained by the terminal from a network or another device after the terminal obtains a brand and a model of a target device. In a remote assistance system provided in an embodiment of this application, a terminal 20 obtains two-dimensional or three-dimensional data of a control interface, such as a control device or a control panel, corresponding to a target device 10, and presents a virtual control interface corresponding to the data on a screen of a video call between the terminal 20 and a terminal 30. The virtual control interface is also synchronized to the terminal 30. The terminal 30 receives an operation performed by an assisting party (user B) on the virtual control interface presented on the terminal 30, and then sends the operation information to the terminal 20. The terminal 20 restores these operation actions on the video screen based on the received operation information. Alternatively, based on a user operation, the terminal 30 determines and presents the user operation, and synchronizes the user operation to the peer end. In this way, by watching the operation action, user A corresponding to the terminal 20 can learn a method for operating and controlling the target device, and can perform an operation directly on the control panel on the terminal 20 or on a real remote control device. Assisted user A can see, on the terminal of user A, a specific operation performed on the real control panel or remote control. This is very intuitive as if the assisting party gives guidance in person on the scene, and improves efficiency of communication between the two parties.

Figure 4:
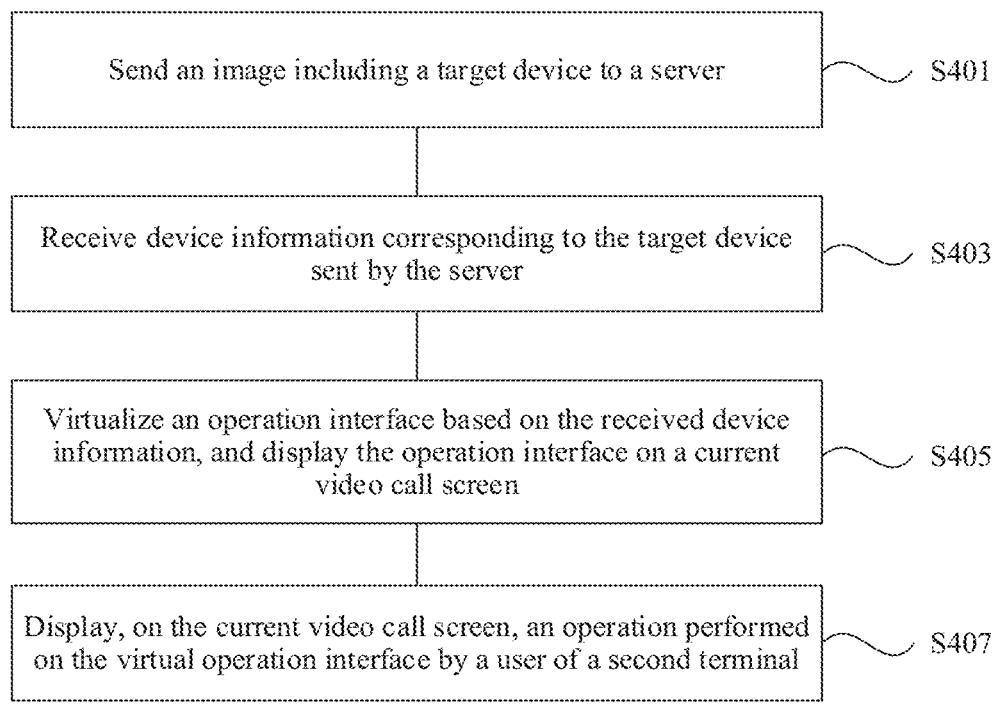
FIG. 4 is a flowchart of a remote assistance method according to an embodiment of this application.

FIG. 4 is a flowchart of a remote assistance method according to an embodiment of this application. As shown in FIG. 4, an embodiment of this application provides a remote assistance method. The method is performed by a terminal 20 corresponding to an assisted person. In a video call process between the terminal 20 and a terminal 30, implementation steps of the method are as follows:

Step S401: Send an image including a target device to a server.

Before step S401, a communication connection is established between the terminal 20 and the terminal 30, to transmit data such as a video, device information, and operation information. In this embodiment of this application, a communication connection may be directly established between the terminal 20 and the terminal 30, for example, by using a D2D communication technology. Alternatively, a connection may be established between the terminal 20 and the terminal 30 by using a video server. For example, in an existing WeChat video call process, the video server sends a video stream of the terminal 20 to the terminal 30 for presentation. A specific implementation is not limited in this application.

The communication connection between the terminal 20 and the terminal 30 may be initiated by the terminal 20. When user A corresponding to the terminal 20 cannot perform an operation on a current target device 10, user B corresponding to the terminal 30 is specified to assist user A in performing an operation on the target device 10. User A establishes a video connection by initiating a request to the terminal 30.

After the communication connection is established between the terminal 20 and the terminal 30, in the video call process, the terminal 20 photographs the target device 10 by using a camera, to obtain an image of the target device 10, generate a video stream including the image of the target device 10, and send the video stream to the terminal 30 in real time. At the same time, the terminal 20 sends the video stream to a cloud server 40.

Alternatively, the terminal 20 may send the cloud server 40 a picture, a short video, or the like that includes the target device 10. In a possible embodiment, the terminal 20 sets a video stream to be obtained. For example, the terminal 20 captures pictures of N frames every several seconds or minutes, and then sends the captured pictures to the cloud server 40. The cloud server 40 identifies the tartlet device 10 in the pictures in real time. This reduces running load of the terminal 20 and reduces traffic, compared with the manner of sending the video stream to the cloud server 40 in real time.

Step S403: Receive device: information corresponding to the target device sent by the server.

Specifically, after the terminal 20 sends the video stream that includes the target device 10, the cloud server 40 performs AI recognition to identify information such as a brand and a model of the target device 10, and then determines a device type of the target device 10. After the device type is determined, the device information corresponding to the device is matched. The device information includes a data model of the target device 10, and may further include controllable configuration file data. The data model may be a real remote control used to control the target device 10 in FIG. 1, a virtual operation interface used to control the target device 10 in FIG. 2, a control panel of the target device 10 in FIG. 3, or the like. The controllable configuration file may be control instructions such as "turn on", "turn off", "turn up" "turn down", and "channel". Each control instruction in the controllable configuration file is associated with a button, a knob, or the like on an operation interface in the data model. In this way, when the user operates a control such as the button or the knob on the operation interface, the terminal 20 can determine a control instruction corresponding to each operation. For example, a controllable configuration file corresponding to the "OFF" button is that an instruction for turning off the target device 10 is executed after the "OFF" button is pressed.

Step S405: Virtualize an operation interface based on the received device information, and display the operation interface on a current video call screen.

If the terminal 20 does not have a function of controlling the target device 10 (for example, the terminal 20 does not have an infrared emission function, or is not connected to the target device), or if the user does not need to use the terminal 20 to directly control the target device 10, or in other cases, the user may select data content to he requested or received from the server, for example, by using a provided menu option or voice prompt. The cloud server 40 may send only the data model corresponding to the target device 10. After receiving the data model, the terminal 20 presents, on a current video screen, an image of a physical object such as a real remote control device, a real control panel on the tartlet device 10, or a control device corresponding to the target device 10.

In a first possible embodiment, as shown by the terminal 20 in FIG. 1 (actually, interfaces displayed on the terminal 20 and the terminal 30 are the same, for details, refer to the display interface of the terminal 30), after receiving a data model (and controllable configuration file data) of an air conditioner, the terminal 20 may choose to virtualize, on the terminal 20, an air conditioner remote control matching the air conditioner (a control interface displayed on a video screen may be selected by the user or may be the default). The virtual air conditioner remote control is the same as a real air conditioner remote control, and includes buttons such as a virtual "ON/OFF" button used to control startup or shutdown of the air conditioner, and virtual buttons "−" and "+" used to control a temperature of the air conditioner. The terminal 20 synchronizes the displayed air conditioner remote control to the terminal 30, and user B corresponding to the terminal 30 can operate a button of the air conditioner remote control displayed on the video screen.

Even if the terminal 20 and the terminal 30 do not obtain a controllable configuration file, when the user operates the button of the air conditioner remote control on the video screen, the terminal still presents a visual effect corresponding to the operation, and then sends the visual effect to the peer terminal in real time, so that user A can view an operation effect and learn an operation for controlling the target device 10. In addition, if user A performs an operation on the virtual air conditioner remote control of the terminal 20, user B can also view the operation of user A, and therefore can provide guidance and assistance for user A in real time.

In a second possible embodiment, as shown by the virtual operation interface displayed on the terminal in FIG. 2, the terminal 20 receives a data model and a controllable configuration file of an air conditioner, and chooses to virtualize, on the terminal 20, a virtual operation interface used to control the air conditioner. The virtual operation interface includes buttons such as a virtual "ON/OFF" button used to control startup or shutdown of the air conditioner, and upward and downward virtual buttons used to control a temperature of the air conditioner. The terminal 20 sends the displayed virtual operation interface to the terminal 30, and user B corresponding to the terminal 30 can operate a button on the virtual operation interface.

Because the terminal 20 receives the controllable configuration file of the air conditioner, if user A operates a button on the virtual operation interface on the video screen, the terminal 20 sends, based on an instruction for controlling the air conditioner of a controllable configuration file corresponding to the button, the instruction to the air conditioner in a transmission mode such as infrared, Bluetooth, or data traffic, to directly control the air conditioner.

In the foregoing two possible embodiments, the terminal 20 needs to bind the received device information to the target device 10 in the video stream, so that the virtual operation interface displayed by the terminal 20 based on the device information corresponds to the target device 10, to prevent the terminal 20 from still using a virtual operation interface of a previous device after the target device 10 in the video stream changes. Specifically, the terminal 20 continuously or intermittently sends the image of the target device 10 to the cloud server 40, if the device image identified by the cloud server 40 does not change, the device information of the target device 10 sent to the terminal 20 is not to be changed. If the cloud server cannot identify the image of the target device 10, the cloud server sends notification information to the terminal 20, so that the terminal 20 stops displaying the virtual operation interface in the video.

Step S407: Display, on the current video call screen, an operation performed on the virtual operation interface by a user of a second terminal.

After receiving the device information sent by the cloud server 40, the terminal 20 presents the virtual operation interface in the video stream. In addition, the device information is sent to the terminal 30 (synchronized to the peer end by using an audio and video synchronization algorithm or sent separately), so that the video call screen including the virtual operation interface is synchronized to the terminal 30. This step is to ensure that content displayed on the terminal 20 and the terminal 30 is the same. In this way, the virtual operation interface is also presented on the terminal 30 to assist user A in controlling the device.

The cloud server 40 may directly deliver the device information to the terminal 20 and the terminal 30. The terminal 20 does not need to forward the device information, thereby reducing workload of the terminal 20. However, the manner in which the terminal 20 synchronizes the virtual operation interface is simpler during implementation.

After user B corresponding to the terminal 30 performs an operation on the virtual operation interface, the terminal 30 records operation information such as a coordinate point of a sliding operation, an operation time, a quantity of taps, and pressing duration in the operation process, and sends the operation information to the terminal 20. In addition, a visual effect corresponding to the operation is presented on the virtual operation interface on the current video call screen of the terminal 30. For example, a button is recessed downward as the user presses, and is recovered as the user raises the hand. The visual effect is synchronized to the terminal 20, so that the user of the terminal 20 can intuitively see how to operate the remote control. A specific synchronization algorithm is the prior art. For example, synchronization is implemented by using an audio and video synchronization algorithm or a timestamping manner. Details are not described herein.

In this embodiment of this application, a plurality of methods may be used to control the target device 10. For example, in a possible embodiment, the terminal 20 establishes a smart home interconnection protocol with the target device. After receiving the operation information sent by the terminal 30, the terminal 20 parses the operation information, converts the operation information into an instruction by using the smart home interconnection protocol, and sends the instruction to the air conditioner in a transmission mode such as infrared, Wi-Fi, Bluetooth, or data traffic. In this way, user A corresponding to the terminal 20 does not need to perform an operation again. Alternatively, the terminal 30 may determine, based on the operation of the user, a control instruction corresponding to the operation of the user, and send the control instruction to the terminal 20. Accordingly, the terminal 20 sends the control instruction to the target device by using, for example, an infrared instruction, a Bluetooth instruction, a Wi-Fi instruction, or a point-to-point instruction, to control the target device.

In another possible embodiment, if the terminal 20 does not have an infrared emission function, or is not connected to the target device 10, or in other cases, the terminal 30 presents, on the virtual operation interface on the current video screen, a visual effect corresponding to the operation, and sends the visual effect to the terminal 20 in real time. By viewing the visual effect corresponding to the operation, the user corresponding to the terminal 20 can learn a method for operating and controlling the air conditioner, and then directly perform an operation on a physical object such as a physical remote control, a control panel on the target device 10, or a control device corresponding to the target device 10.

It should be further noted that, after user A performs an operation on the operation interface on the terminal 20, the terminal 20 presents, on the virtual operation interface on the current video screen, a visual effect corresponding to the operation, and sends the visual effect to the terminal 30 in real time. By viewing the visual effect corresponding to the operation, user B corresponding to the terminal 30 determines whether the operation performed by user A corresponding to the terminal 20 is correct, and can provide guidance in a timely manner, for example, by using a voice and/or by performing an operation on the virtual operation interface.

Similarly, after performing an operation on the operation interface on the terminal 20, user A needs to send the operation information to the terminal 30. In a possible embodiment, user A draws a marked circle on a screen of the terminal 20 for an area, and the terminal 20 needs to record operation information such as a series of coordinate points, a timestamp, a quantity of times, and pressing duration that are on the screen at that time, to present a corresponding visual effect. The visual effect is synchronized to the peer end. For example, a video sent by the terminal 20 is matched by using the timestamp, to ensure that content seen by the two parties on the screen is the same.

This application provides the remote assistance method performed by the terminal 20. After a video stream including the target device 10 is obtained and related device information of the device is obtained based on the video stream, a virtual control interface is presented in a video on the terminal 20 by using an AR technology, and the virtual control interface is presented on video call screens of terminals of all parties in communication by using an audio and video synchronization technology. A visual effect of an operation performed by a user of any terminal on the virtual control interface is synchronized to all parties in the video call. In this way, by watching these operation actions, a user that needs assistance, for example, user A corresponding to the terminal 20, can learn a method for operating and controlling the target device, and can perform an operation directly on the control panel on the terminal 20 or on a real remote control device. Assisted user A can see, on the terminal of user A, a specific operation performed on the real control panel or remote control. This is very intuitive as if the assisting party gives guidance in person on the scene, improves efficiency of communication between the two parties, and reduces the difficulty of remote assistance.

Figure 5:
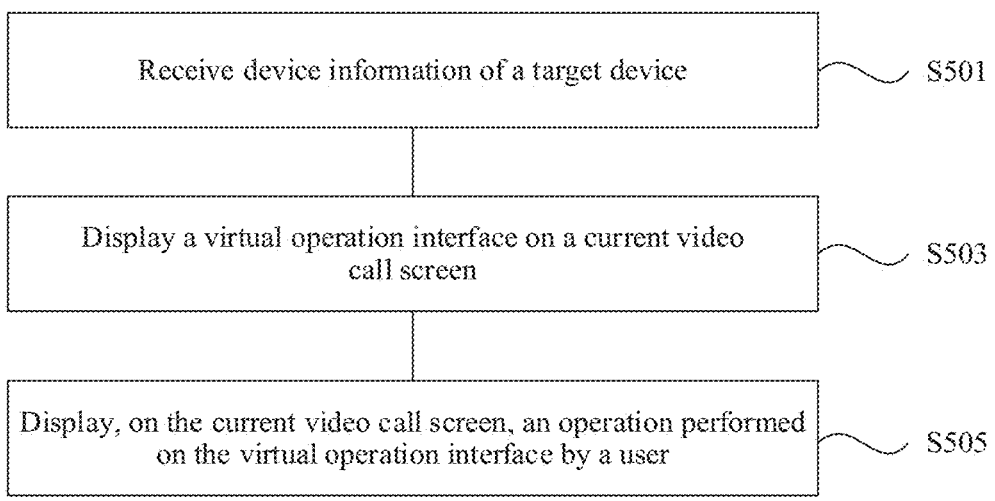
FIG. 5 is a flowchart of another remote assistance method according to an embodiment of this application.

FIG. 5 is a flowchart of another remote assistance method according to an embodiment of this application. As shown in FIG. 5, an embodiment of this application provides another remote assistance method. The method is performed by a terminal 30 corresponding to an assisting person. In a video call process between a terminal 20 and the terminal 30, implementation steps of the method are as follows:

Step S501: Receive device information of a target device.

Before step S501, a communication connection is established between the terminal 20 and the terminal 30. The communication connection between the terminal 20 and the terminal 30 may be initiated by the terminal 30. When user B corresponding to the terminal 30 learns that user A corresponding to the terminal 20 cannot perform an operation on a device, user B establishes a video connection by initiating a request to the terminal 20. Certainly, the communication connection between the terminal 20 and the terminal 30 may alternatively be initiated by the terminal 20.

In a possible embodiment, the device information obtained by the terminal 30 may not be sent by the terminal 20. After identifying a target device 10 and obtaining device information corresponding to the device, a cloud server 40 directly delivers the device information to the terminal 20 and the terminal 30. The terminal 20 does not need to forward the device information, thereby reducing workload of the terminal 20.

Step S503: Display a virtual operation interface on a current video call screen.

The terminal 30 can virtualize an operation interface based on the received device information. If the device information received by the terminal 30 only includes a data model corresponding to the target device 10, after receiving the data model, the terminal 30 presents the virtual operation interface on a current video screen, and the operation interface may correspond to an image of a physical object such as a real remote control device, a real control panel on the target device 10, or a control device corresponding to the target device 10.

In a first possible embodiment, as shown by the terminal 30 in FIG. 1, after receiving a data model of an air conditioner, the terminal 30 virtualizes, on the terminal 30, an air conditioner remote control matching the air conditioner. The virtual air conditioner remote control is the same as a real air conditioner remote control, and includes buttons such as a virtual "ON/OFF" button used to control startup or shutdown of the air conditioner, and virtual buttons "−" and "+" used to control a temperature of the air conditioner. The terminal 20 sends the displayed air conditioner remote control to the terminal 30, and user B corresponding to the terminal 30 can operate a button of the air conditioner remote control on the video screen.

Alternatively, a virtual operation interface displayed on the terminal 20 may be synchronized to the terminal 30 by using an audio and video synchronization technology.

When user B operates the button of the virtual air conditioner remote control on the video screen, the terminal 30 presents a visual effect corresponding to the operation, and sends the visual effect to the terminal 20 in real time, so that user A can view an operation effect and learn an operation for controlling the target device 10.

It should be noted that whether the air conditioner remote control or another control device such as a control panel of the air conditioner is virtualized on the terminal 30 needs to be determined based on selection by user A corresponding to the terminal 20. If presentation selected by user A is the air conditioner remote control, the air conditioner remote control is also presented on the terminal 30. This ensures that operation interfaces of control device images presented on the terminal 20 and the terminal 30 are the same. Therefore, in this implementation, when sending the device information to the terminal 30, the terminal 20 selects a data model in the device information, so that only an operation interface of a control device image displayed on the terminal 20 can be presented on the terminal 30.

If the terminal 30 receives a controllable configuration file of the air conditioner, the terminal 30 generates a corresponding control instruction based on an operation of the user, and sends the control instruction to the terminal 20. The terminal 20 may send the control instruction to the air conditioner in a transmission mode such as infrared, Wi-Fi, Bluetooth, or data traffic, to directly control the air conditioner.

In the foregoing two possible embodiments, the terminal 30 needs to bind the received device information to a corresponding real device in a video stream, so that the virtual operation interface displayed by the terminal 30 based on the device information corresponds to the device, to prevent the terminal 30 from still using a virtual operation interface of a previous device after the device in the video stream changes. Details are described above, and are not described herein again.

Step S505: Display, on the current video call screen, an operation performed on the virtual operation interface by a user.

User B corresponding to the terminal 30 performs an operation on the virtual operation interface, and the terminal 30 records operation information such as a coordinate point of a sliding operation, an operation time, a quantity of taps, and pressing duration in the operation process, and sends the operation information to the terminal 20. In addition, a visual effect corresponding to the operation is presented on the virtual operation interface on the current video screen of the terminal 30. For example, a button is recessed downward as the user presses, and is recovered as the user raises the hand. The visual effect is synchronized to the terminal 20, so that the user of the terminal 20 can intuitively and synchronously see an operation performed on the remote control.

An operation performed by user B on the virtual operation interface on the terminal 30 may alternatively be sent to the terminal 20 in another manner or by using another algorithm, to ensure that content seen by the two parties on the screen is the same.

This application provides the remote assistance method performed by the terminal 30, The video call screen including the virtual operation interface is presented on the terminal 30. User B corresponding to the terminal 30 performs an operation on the virtual operation interface on the terminal 30. The terminal 20 synchronously presents the operation performed by user B on the virtual operation interface, to assist user A corresponding to the terminal 20 in controlling the target device 10.

Figure 6A:
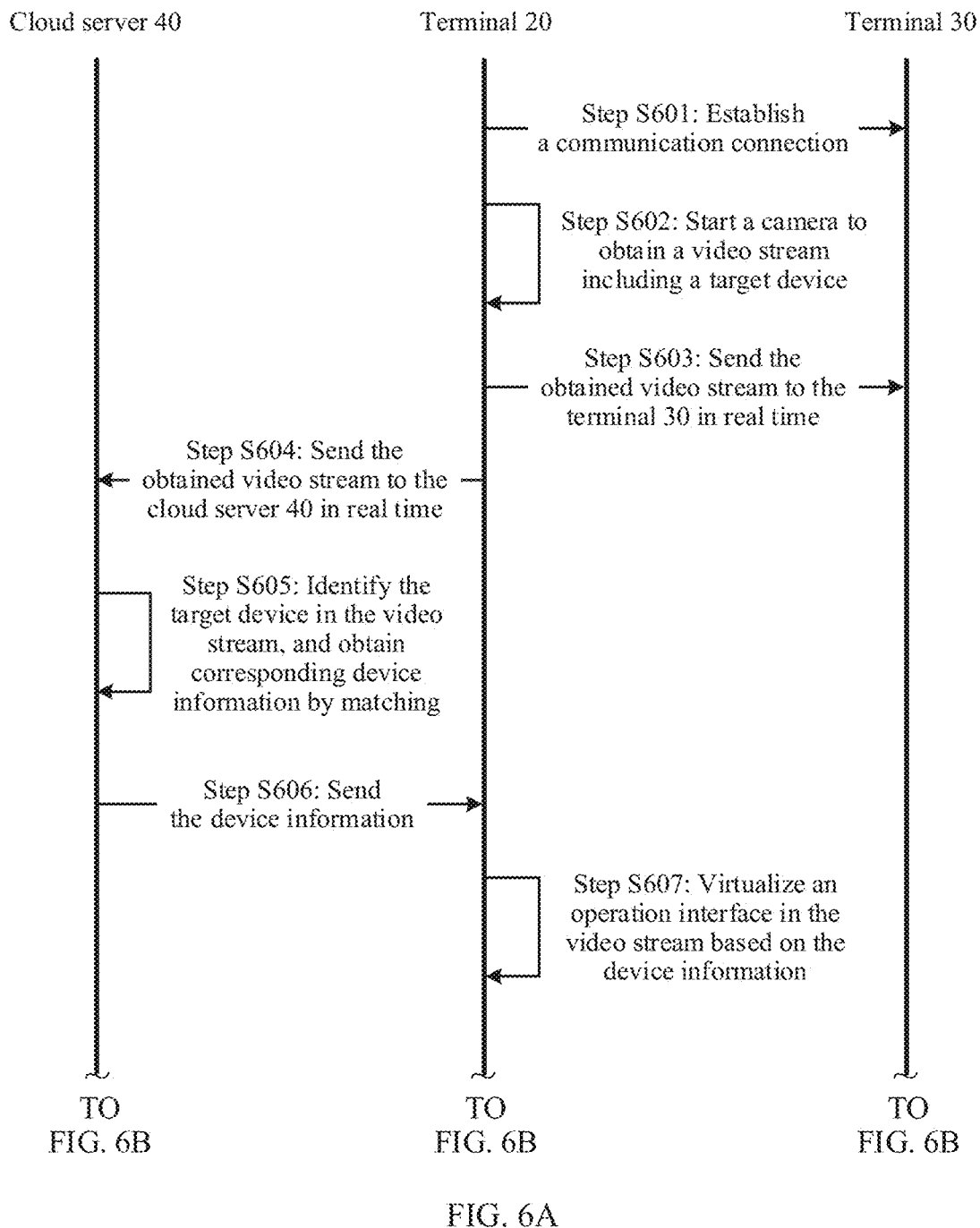
FIG. 6A and FIG. 6B are a schematic flowchart of a communication process between a first terminal and a second terminal according to an embodiment of this application.
Figure 6B:
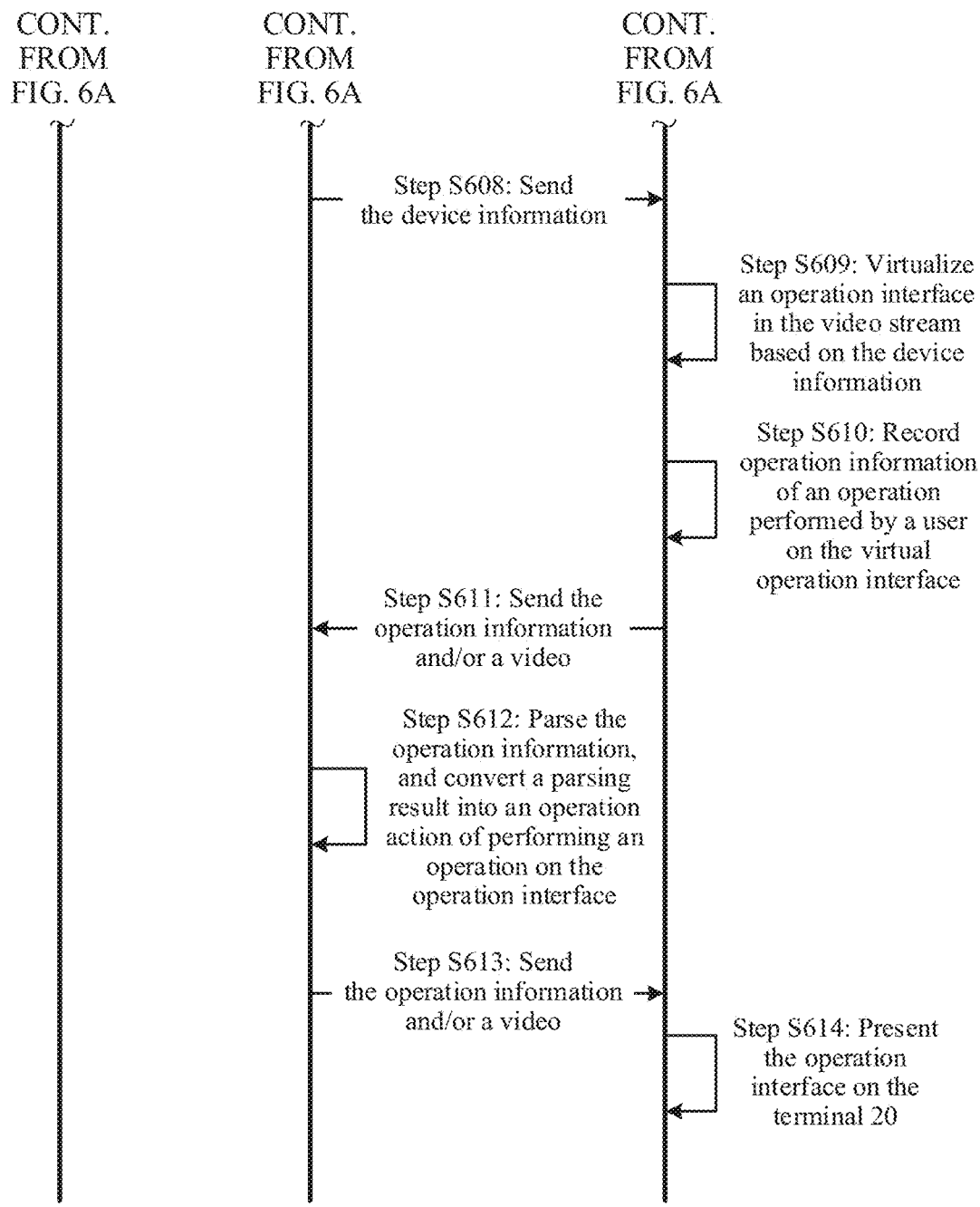

FIG. 6A and FIG. 6B are a schematic flowchart of a communication process between a first terminal and a second terminal according to an embodiment of this application. As shown in FIG. 6A and FIG. 6B, the communication process between the first terminal and the second terminal is specifically as follows:

Step S601: Establish a communication connection between a terminal 20 and a terminal 30.

The communication connection is established to transmit data such as a video, device information, and operation information.

In a possible embodiment, the communication connection between the terminal 20 and the terminal 30 may be initiated by the terminal 20. When user A corresponding to the terminal 20 cannot perform an operation on a current target device 10, user B corresponding to the terminal 30 is specified to assist user A in performing an operation on the target device 10. User A establishes a video connection by initiating a request to the terminal 30.

In a possible embodiment, the communication connection between the terminal 20 and the terminal 30 may be initiated by the terminal 30. When user B corresponding to the terminal 30 learns that user A corresponding to the terminal 20 cannot perform an operation on a device, user B establishes a video connection by initiating a request to the terminal 20.

In this embodiment of this application, a communication connection may be directly established between the terminal 20 and the terminal 30, for example, by using a D2D communication technology. Alternatively, a connection may be established between the terminal 20 and the terminal 30 by using a video server. For example, in an existing WeChat video call process, the video server sends a video stream of the terminal 20 to the terminal 30 for presentation.

A specific implementation is not limited in this application.

Step S602: Start a camera of the terminal 20 to obtain a video stream including the target device 10.

After the communication connection is established between the terminal 20 and the terminal 30, the terminal 20 starts the camera to photograph the target device 10, to obtain an image of the target device 10 and generate a video stream including the image of the target device 10.

Step S603: The terminal 20 sends the obtained video stream to the terminal 30 in real time.

In this embodiment of this application, after the connection is established between the terminal 20 and the terminal 30, the video stream of the terminal 20 may be sent to the terminal 30 in real time for presentation, so that content displayed on the terminal 20 and the terminal 30 is the same.

Step S504: The terminal 20 sends the obtained video stream to a cloud server 40 in real time.

Alternatively, the terminal 20 may send the cloud server 40 a picture, a short video, or the like that includes the target device 10. In a possible embodiment, the terminal 20 sets a video stream to be obtained. For example, the terminal 20 captures pictures of N frames every several seconds or minutes, and then sends the captured pictures to the cloud server 40. The cloud server 40 identifies the target device 10 in the pictures in real time. This reduces running load of the terminal 20 and reduces traffic, compared with the manner of sending the video stream to the cloud server 40 in real time.

Step S605: The cloud server 40 identifies the target device 10 in the image based on the received image that includes the target device 10, and obtains, by matching, device information corresponding to the device based on the target device 10.

Specifically, after the terminal 20 sends the video stream that includes the target device 10, the cloud server 40 performs AI recognition to identify information such as a brand and a model of the target device 10, and then determines a device type of the target device 10. After the device type is determined, the device information corresponding to the device is matched. The device information includes a data model of the target device 10, and may further include controllable configuration file data. The data model may be a real remote control used to control the target device 10 in FIG. 1, a virtual operation interface used to control the target device 10 in FIG. 2, a control panel of the target device 10 in FIG. 3, or the like. The controllable configuration file may be control instructions such as "turn on", "turn off", "turn up", "turn down", and "channel". Each control instruction in the controllable configuration file is associated with a button, a knob, or the like on an operation interface in the data model. In this way, when the user operates a control such as the button or the knob on the operation interface, the terminal 20 can determine a control instruction corresponding to each operation. For example, a controllable configuration file corresponding to the "OFF" button is that an instruction for turning off the target device 10 is executed after the "OFF" button is pressed.

Step S606: The cloud server 40 sends the device information to the terminal 20,

If the terminal 20 does not have a function of controlling the target device 10 (for example, the terminal 20 does not have an infrared emission function, or is not connected to the target device), or if the user does not need to use the terminal 20 to directly control the target device 10, or in other cases, the cloud server 40 may send only the data model corresponding to the target device 10. If the terminal 20 has a transmission function such as infrared, Wi-Fi, Bluetooth, or data traffic, or has a function of directly controlling a target device, the cloud server 40 sends the data model and the controllable configuration file that are corresponding to the target device 10.

Step S607: The terminal 20 virtualizes an operation interface in the video stream based on the device information.

After receiving the data model, the terminal 20 presents, on a current video screen, an image of a physical object such as a real remote control device, a real control panel on the target device 10, or a control device corresponding to the target device 10. In a first possible embodiment, as shown by the terminal 20 in FIG. 1 (actually, interfaces displayed on the terminal 20 and the terminal 30 are the same; for details, refer to the display interface of the terminal 30), after receiving a data model of an air conditioner, the terminal 20 chooses to virtualize, on the terminal 20, an air conditioner remote control matching the air conditioner (a control interface displayed on a video screen may be selected by the user or may be the default). The virtual air conditioner remote control is the same as a real air conditioner remote control, and includes buttons such as a virtual "ON/OFF" button used to control startup or shutdown of the air conditioner, and virtual buttons "−" and "+" used to control a temperature of the air conditioner. The terminal 20 sends the displayed air conditioner remote control to the terminal 30, and user B corresponding to the terminal 30 can operate a button of the air conditioner remote control on the video screen.

Even if the terminal 20 and the terminal 30 do not have a controllable configuration file, when the user operates the button of the air conditioner remote control on the video screen, the terminal still presents a visual effect corresponding to the operation, and then sends the visual effect to the peer terminal in real time, so that user A can view an operation effect and learn an operation for controlling the target device 10. In addition, user B can also view an operation of user A, and therefore can provide guidance and assistance for user A in real time.

After receiving the data model and the controllable configuration file, the terminal 20 may not only present, on a current video screen, an image of a physical object such as a real remote control device, a real control panel on the target device 10, or a real control device corresponding to the target device 10, but also present the virtual operation interface shown in FIG. 2, In a second possible embodiment, as shown by the virtual operation interface displayed on the terminal in FIG. 2, the terminal 20 receives a data model and a controllable configuration file of an air conditioner, and chooses to virtualize, on the terminal 20, a virtual operation interface used to control the air conditioner. The virtual operation interface includes buttons such as a virtual "ON/OFF" button used to control startup or shutdown of the air conditioner, and upward and downward virtual buttons used to control a temperature of the air conditioner. The terminal 20 sends the displayed virtual operation interface to the terminal 30, and user B corresponding to the terminal 30 can operate a button on the virtual operation interface.

Because the terminal 20 receives the controllable configuration file of the air conditioner, if user A operates a button on the virtual operation interface on the video screen, the terminal 20 sends, based on an instruction for controlling the air conditioner of a controllable configuration file corresponding to the button, the instruction to the air conditioner in a transmission mode such as infrared, Wi-Fi, Bluetooth, or data traffic, to directly control the air conditioner.

In the foregoing two possible embodiments, the terminal 20 needs to bind the received device information to the target device 10 in the video stream, so that the virtual operation interface displayed by the terminal 20 based on the device information corresponds to the target device 10, to prevent the terminal 20 from still using a virtual operation interface of a previous device after the target device 10 in the video stream charges. Specifically, the terminal 20 continuously or intermittently sends the image of the target device 10 to the cloud server 40. If the device image identified by the cloud server 40 does not change, the device information of the target device 10 sent to the terminal 20 is not to be changed. If the cloud server cannot identify the image of the target device 10, the cloud server sends notification information to the terminal 20, so that the terminal 20 stops displaying the virtual operation interface in the video.

Step S608: The terminal 20 sends the device information to the terminal 30.

In a possible embodiment, the device information obtained by the terminal 30 may not be sent by the terminal 20. After identifying the device and obtaining the device information corresponding to the device, the cloud server 40 directly delivers the device information to the terminal 20 and the terminal 30. The terminal 20 does not need to forward the device information, thereby reducing workload of the terminal 20.

Step S609: The terminal 30 virtualizes an operation interface in the video stream based on the device information.

If the device information received by the terminal 30 only includes the data model corresponding to the target device 10, after receiving the data model, the terminal 30 presents, on a current video screen, an image of a physical object such as a real remote control device, a real control panel on the target device 10, or a control device corresponding to the target device 10.

In a first possible embodiment, as shown by the terminal 30 in FIG. 1, after receiving a data model of an air conditioner, the terminal 30 virtualizes, on the terminal 30 based on selection by the terminal 20, an air conditioner remote control matching the air conditioner. The virtual air conditioner remote control is the same as a real air conditioner remote control, and includes buttons such as a virtual "ON/OFF" button used to control startup or shutdown of the air conditioner, and virtual buttons "−" and "+" used to control a temperature of the air conditioner. The terminal 20 sends the displayed air conditioner remote control to the terminal 30, and user B corresponding to the terminal 30 can operate a button of the air conditioner remote control on the video screen.

When user B operates the button of the air conditioner remote control on the video screen, the terminal 30 presents a visual effect corresponding to the operation, and sends the visual effect to the terminal 20 in real time, so that user A can view an operation effect and learn an operation for controlling the target device 10.

It should be noted that Whether the air conditioner remote control or another control device such as a control panel of the air conditioner is virtualized on the terminal 30 needs to be determined based on selection by user A corresponding to the terminal 20. If presentation selected by user A is the air conditioner remote control, the air conditioner remote control is also presented on the terminal 30. This ensures that operation interfaces of control device images presented on the terminal 20 and the terminal 30 are the same. Therefore, in this implementation, when sending the device information to the terminal 30, the terminal 20 selects a data model in the device information, so that only an operation interface of a control device image displayed on the terminal 20 can be presented on the terminal 30.

If the device information received by the terminal 30 includes the data model and the controllable configuration file that are corresponding to the target device 10, after receiving the data model and the controllable configuration file, the terminal 30 may not only present, on a current video screen, an image of a physical object such as a real remote control device, a real control panel on the target device 10, or a real control device corresponding to the target device 10, but also present the virtual operation interface shown in FIG. 2.

In a second possible embodiment, as shown by the virtual operation interface displayed on the terminal in FIG. 2, after receiving a data model and a controllable configuration file of an air conditioner, the terminal 30 virtualizes, on the terminal 30 based on selection by the terminal 20, a virtual operation interface used to control the air conditioner. The virtual operation interface includes buttons such as a virtual "ON/OFF" button used to control startup or shutdown of the air conditioner, and upward and downward virtual buttons used to control a temperature of the air conditioner. The terminal 20 sends the displayed virtual operation interface to the terminal 30, and user B corresponding to the terminal 30 can operate a button on the virtual operation interface.

Because the terminal 30 receives the controllable configuration file of the air conditioner, if user B operates a button on the virtual operation interface on the video screen, after generated operation information is sent to the terminal 20, the terminal 20 sends, based on an instruction for controlling the air conditioner of a controllable configuration file corresponding to the button, the instruction to the air conditioner in a transmission mode such as infrared, Wi-Fi, Bluetooth, or data traffic, to directly control the air conditioner.

In the foregoing two possible embodiments, the terminal 30 needs to bind the received device information to a real device in a video stream, so that the virtual operation interface displayed by the terminal 30 based on the device information corresponds to the device, to prevent the terminal 30 from still using a virtual operation interface of a previous device after the device in the video stream changes.

Step S610: The terminal 30 records operation information of an operation performed by the user on the virtual operation interface.

User B corresponding to the terminal 30 performs an operation on the virtual operation interface, and the terminal 30 records operation information such as a coordinate point of a sliding operation, an operation time, a quantity of taps, and pressing duration in the operation process. After determining that user B completes the operation in the control process, the terminal 30 sends the recorded operation information to the terminal 20. In addition, a visual effect corresponding to the operation is presented on the virtual operation interface on the current video screen of the terminal 30. For example, a button is recessed downward as the user presses, and is recovered as the user raises the hand. The visual effect is also synchronized to the terminal 20, so that the user of the terminal 20 can intuitively see how to operate the remote control.

It should be further noted that, after performing an operation on the video stream on the terminal 30, user B needs to send the operation information to the terminal 20, to ensure that content seen by the two parties on the screen is the same.

Step S611: The terminal 30 sends operation information and/or a video to the terminal 20.

Step S612: The terminal 20 parses the operation information, and converts a parsing result into an operation action of performing an operation on the operation interface.

After receiving and parsing the operation information, the terminal 20 informs, in a manner such as video demonstration, user A of how to perform an operation on the terminal 20, to control the target device 10, in addition, a visual effect corresponding to the operation is presented on the virtual operation interface on the current video screen of the terminal 30. For example, a button is recessed downward as the user presses, and is recovered as the user raises the hand. The visual effect is also synchronized to the terminal 20, so that the user of the terminal 20 can intuitively see how to operate the remote control.

In this embodiment of this application, a plurality of methods may be used to control the target device 10. For example, in a possible embodiment, the terminal 20 establishes a smart home interconnection protocol with the target device. After receiving the operation information sent by the terminal 30, the terminal 20 parses the operation information, converts the operation information into an instruction by using the smart home interconnection protocol, and sends the instruction to the air conditioner in a transmission mode such as infrared, Wi-Fi, Bluetooth, or data traffic. In this way, user A corresponding to the terminal 20 does not need to perform an operation again.

In another possible embodiment, if the terminal 20 does not have an infrared emission function, or is not connected to the target device 10, or in other cases, the terminal 30 presents, on the virtual operation interface on the current video screen, a visual effect corresponding to the operation, and sends the visual effect to the terminal 20 in real time. By viewing the visual effect corresponding to the operation, the user corresponding to the terminal 20 can learn a method for operating and controlling the air conditioner, and then directly perform an operation on a physical object such as a physical remote control, a control panel on the target device 10, or a control device corresponding to the target device 10.

Step S613: The terminal 20 sends operation information and/or a video to the terminal 30.

Step S614: The terminal 30 presents the operation interface on the terminal 20.

After user A performs an operation on the video stream on the terminal 20, the terminal 20 presents, on the virtual operation interface on the current video screen, a visual effect corresponding to the operation, and sends the visual effect to the terminal 30 in real time. By viewing the visual effect corresponding to the operation, user B corresponding to the terminal 30 determines whether the operation performed by user A corresponding to the terminal 20 is correct.

Similarly, after performing an operation on the operation interface on the terminal 20, user A needs to send the operation information to the terminal 30. In a possible embodiment, user A draws a marked circle on a screen of the terminal 20 for an area, and the terminal 20 needs to record operation information such as a series of coordinate points, a timestamp, and a quantity of times that are on the screen at that time. Then, the operation information is sent to the terminal 30 by using a dedicated communications channel, and a video sent by the terminal 20 is matched by using the timestamp, to ensure that content seen by the two parties on the screen is the same.

A remote assistance system provided in an embodiment of this application is configured to implement the foregoing method embodiments. Specifically, after obtaining a video stream including a target device 10, a terminal 20 sends the video stream to a terminal 30 and a server 40. The server 40 obtains two-dimensional or three-dimensional data of a real control interface, such as a control device or a control panel, corresponding to the target device 10, and then sends the two-dimensional or three-dimensional data to the terminal 20 and the terminal 30. A virtual control interface is presented in videos on the terminal 20 and the terminal 30 by using an AR technology. The terminal 30 receives an operation performed by an assisting party (user B) on the virtual control interface, and then sends the operation information to the terminal 20. The terminal 20 restores these operation actions on a video screen based on the received operation information. By watching the restored operation actions, user A corresponding to the terminal 20 can learn a method for operating and controlling the target device, and can perform an operation directly on the control panel on the terminal 20 or on a real remote control device. Assisted user A can see, on the terminal of user A, a specific operation performed on the real control panel or remote control. This is very intuitive as if the assisting party gives guidance in person on the scene, and improves efficiency of communication between the two parties.

For the technical solution in the foregoing "first possible embodiment", this application lists an embodiment to facilitate understanding: It is assumed that an elderly person at home is user A corresponding to the terminal 20, and a son in an office is user B corresponding to the terminal 30. An "AR Remote Assistance" application is installed on smartphones of the two people. When elderly person A needs to turn on a sleep mode of an air conditioner but cannot find a remote control or does not know how to operate the remote control, elderly person A opens the "AR Remote Assistance" application on the mobile phone to seek help from son B. Elderly person A points (a camera of) the mobile phone at the air conditioner. An image of the air conditioner is displayed on the mobile phone screen of son B, and a remote control of the air conditioner is displayed on the screen. Son B operates a corresponding button on the remote control interface, and an instruction is returned to the mobile phone of elderly person A. When elderly person A watches the son operating the remote control on the mobile phone of elderly person A, the mobile phone of elderly person A turns on the sleep mode of the air conditioner by using a smart home interconnection protocol after receiving the air conditioner control instruction.

For the technical solution in the foregoing "second possible embodiment", this application lists an embodiment to facilitate understanding: It is assumed that an elderly person at home is user A corresponding to the terminal 20, and a son in an office is user B corresponding to the terminal 30. An "AR Remote Assistance" application is installed on smartphones of the two people. Elderly person A needs to turn on a sleep mode of an air conditioner, a remote control of the air conditioner is in the hands of elderly person A, and elderly person A opens the "AR Remote Assistance" application on the mobile phone to seek help from son B. Elderly person A points the mobile phone at the remote control. An image of the remote control is displayed on the mobile phone screen of son B. Son B operates a corresponding button on the remote control interface, and an instruction is returned to the mobile phone of elderly person A. When elderly person A watches the son operating the remote control on the mobile phone of elderly person A, the mobile phone of elderly person A turns on the sleep mode of the air conditioner by using the smart home interconnection protocol after receiving the air conditioner control instruction.

An embodiment of this application further provides a remote control system, configured to implement the foregoing method embodiments: Specifically, the system includes a target device 10 that needs to be controlled, a cloud server 40, a remote control apparatus 70 performed by a terminal 20, and a remote control apparatus 80 performed by a terminal 30. By using an AR technology, the system can superimpose a virtual operation interface on a video stream obtained by the terminal 20. This facilitates communication between an assisting party and an assisted party, and makes it easier for the assisting party to assist the assisted party in operating a device.

Figure 7:
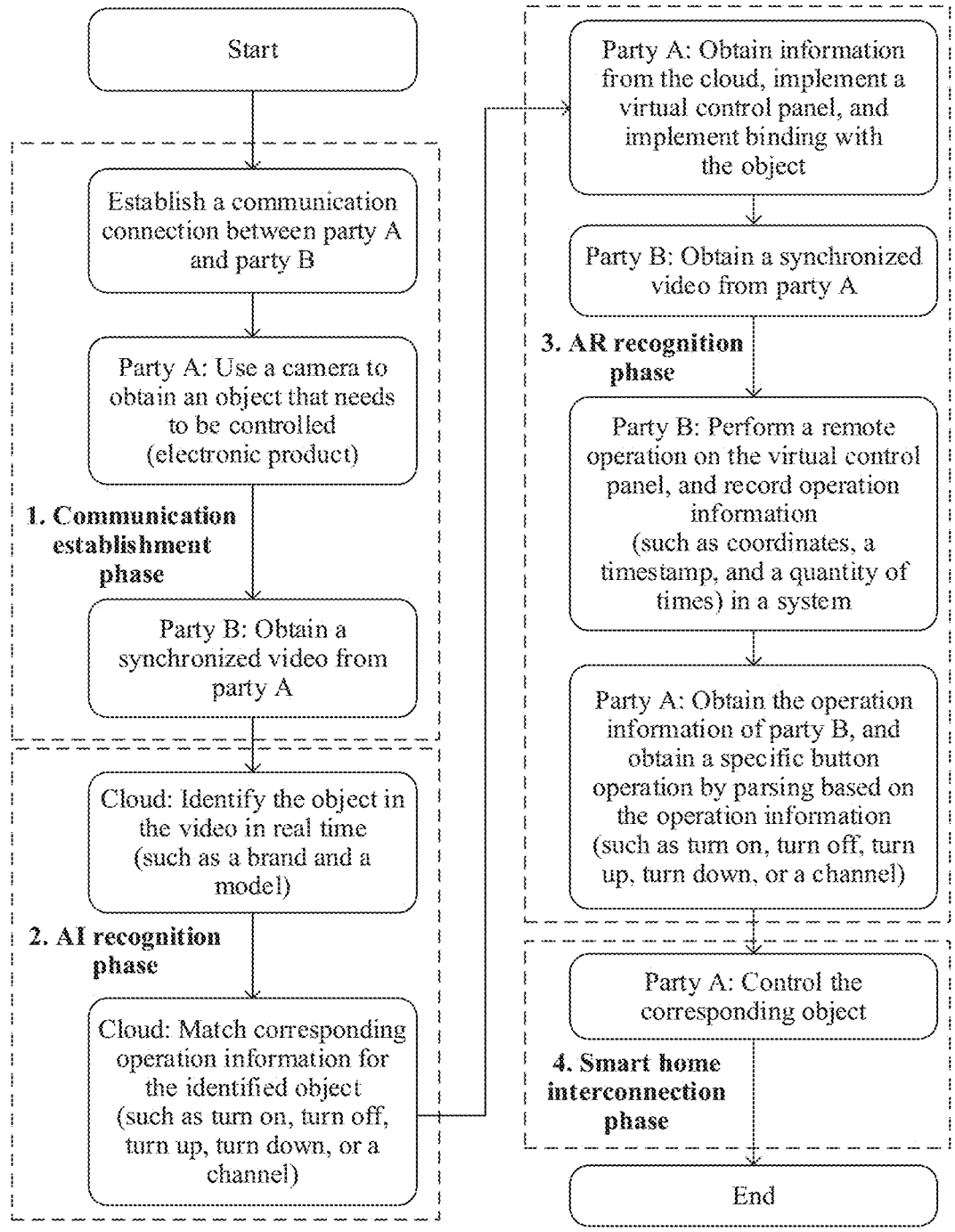
FIG. 7 is a schematic diagram of a working procedure between devices in a remote assistance system according to an embodiment of this application.

FIG. 7 is a schematic diagram of a working procedure between devices in a remote assistance system according to an embodiment of this application. As shown in FIG. 7, a process of implementing remote assistance by the system mainly includes a communication establishment phase, an AI recognition phase, an AR recognition phase, and a smart home interconnection phase. Party A represents a terminal 20, party B represents a terminal 30, a cloud represents a cloud server 40, and an object represents a target device 10.
Communication Phase:

Step 1: Establish a communication connection between party A and party B.

The communication connection is established to transmit data such as a video, device information, and operation information.

In a possible embodiment, the communication connection between the terminal 20 and the terminal 30 may be initiated by the terminal 20. When user A corresponding to the terminal 20 cannot perform an operation on a current target device 10, user B corresponding to the terminal 30 is specified to assist user A in performing an operation on the target device 10. User A establishes a video connection by initiating a request to the terminal 30.

In a possible embodiment, the communication connection between the terminal 20 and the terminal 30 may be initiated by the terminal 30. When user B corresponding to the terminal 30 learns that user A corresponding to the terminal 20 cannot perform an operation on a device, user B establishes a video connection by initiating a request to the terminal 20.

In this embodiment of this application, a communication connection may be directly established between the terminal 20 and the terminal 30, for example, by using a D2D communication technology. Alternatively, a connection may be established between the terminal 20 and the terminal 30 by using a video server. For example, in an existing WeChat video call process, the video server sends a video stream of the terminal 20 to the terminal 30 for presentation. A specific implementation is not limited in this application.

Step 2: Party A uses a camera to obtain an object that needs to be controlled.

After the communication connection is established between the terminal 20 and the terminal 30, the terminal 20 starts the camera to photograph the target device 10, to obtain a two-dimensional or three-dimensional structural diagram of the target device 10 and generate a video stream including the two-dimensional or three-dimensional structural diagram of the target device 10.

Step 3: In a video call process between party A and party B, party B obtains, in real time, video content photographed by party A.

In this embodiment of this application, after the connection is established between the terminal 20 and the terminal 30, the video stream of the terminal 20 may be sent to the terminal 30 in real time for presentation, so that content displayed on the terminal 20 and the terminal 30 is the same.
AI Recognition Phase:

Step 1: The cloud identifies an object in the video in real time.

Alternatively, the terminal 20 may send the cloud server 40 a picture, a short video, or the like that includes the target device 10, in a possible embodiment, the terminal 20 sets a video stream to be obtained. For example, the terminal 20 captures pictures of N frames every several seconds or minutes, and then sends the captured pictures to the cloud server 40. The cloud server 40 identifies the target device 10 in the pictures in real time. This reduces running load of the terminal 20 and reduces traffic, compared with the manner of sending the video stream to the cloud server 40 in real time.

Step 2: Match operation information corresponding to the object after information about the object is identified, where the operation information includes information such as turn on, turn off, turn up, turn down, or a channel.

After the terminal 20 sends the video stream that includes the target device 10, the cloud server 40 performs AI recognition to identify information such as a brand and a model of the target device 10, and then determines a device type of the target device 10. After the device type is determined, the device information corresponding to the device is matched. The device information includes a data model of the target device 10, and may further include controllable configuration file data. The data model may be a real remote control used to control the target device 10 in FIG. 1, a virtual operation interface used to control the target device 10 in FIG. 2, a control panel of the target device 10 in FIG. 3, or the like. The controllable configuration file may be control instructions such as "turn on", "turn off", "turn up", "turn down", and "channel". Each control instruction in the controllable configuration file is associated with a button, a knob, or the like on an operation interface in the data model. In this way, when the user operates a control such as the button or the knob on the operation interface, the terminal 20 can determine a control instruction corresponding to each operation. For example, a controllable configuration file corresponding to the "OFF" button is that an instruction for turning off the target device 10 is executed after the "OFF" button is pressed.
AR Recognition Phase:

Step 1: Party A obtains the information about the object from the cloud, implements a virtual operation panel, and binds the operation panel to the object in the video.

In one case, if the terminal 20 does not have a function of controlling the target device 10 (for example, the terminal 20 does not have an infrared emission function, or is not connected to the target device), or if the user does not need to use the terminal 20 to directly control the target device 10, or in other cases, the cloud server 40 may send only the data model corresponding to the target device 10. After receiving the data model, the terminal 20 presents, on a current video screen, an image of a physical object such as a real remote control device, a real control panel on the target device 10, or a control device corresponding to the target device 10. In a first possible embodiment, as shown by the terminal 20 in FIG. 1 (actually, interfaces displayed on the terminal 20 and the terminal 30 are the same; for details, refer to the display interface of the terminal 30), after receiving a data model of an air conditioner, the terminal 20 chooses to virtualize, on the terminal 20, an air conditioner remote control matching the air conditioner (a control interface displayed on a video screen may be selected by the user or ma be the default). The virtual air conditioner remote control is the same as a real air conditioner remote control, and includes buttons such as a virtual "ON/OFF" button used to control startup or shutdown of the air conditioner, and virtual buttons "−" and "+" used to control a temperature of the air conditioner. The terminal 20 sends the displayed air conditioner remote control to the terminal 30, and user B corresponding to the terminal 30 can operate a button of the air conditioner remote control on the video screen.

Even if the terminal 20 and the terminal 30 do not have a controllable configuration file, when the user operates the button of the air conditioner remote control on the video screen, the terminal still presents a visual effect corresponding to the operation, and then sends the visual effect to the peer terminal in real time, so that user A can view an operation effect and learn an operation for controlling the target device 10. In addition, user B can also view an operation of user A, and therefore can provide guidance and assistance for user A in real time.

In another case, if the terminal 20 has a transmission function such as infrared, Wi-Fi, Bluetooth, or data traffic, or has a function of directly controlling a target device, the cloud server 40 sends the data model and the controllable configuration file that are corresponding to the target device 10, her receiving the data model and the controllable configuration file, the terminal 20 may not only present, on a current video screen, an image of a physical object such as a real remote control device, a real control panel on the target device 10, or a real control device corresponding to the target device 10, but also present the virtual operation interface shown in FIG. 2. In a second possible embodiment, as shown by the virtual operation interface displayed on the terminal in FIG. 2, the terminal 20 receives a data model and a controllable configuration file of an air conditioner, and chooses to virtualize, on the terminal 20, a virtual operation interface used to control the air conditioner. The virtual operation interface includes buttons such as a virtual "ON/OFF" button used to control startup or shutdown of the air conditioner, and upward and downward virtual buttons used to control a temperature of the air conditioner. The terminal 20 sends the displayed virtual operation interface to the terminal 30, and user B corresponding to the terminal 30 can operate a button on the virtual operation interface.

Because the terminal 20 receives the controllable configuration file of the air conditioner, if user A operates a button on the virtual operation interface on the video screen, the terminal 20 sends, based on an instruction for controlling the air conditioner of a controllable configuration file corresponding to the button, the instruction to the air conditioner in a transmission mode such as infrared, Wi-Fi, Bluetooth, or data traffic, to directly control the air conditioner.

Step 2: Party B obtains the object information sent by party A, and also virtualizes an operation panel in the video, to obtain the same content as that displayed on a display interface of party A.

The device information obtained by the terminal 30 may not be sent by the terminal 20. After identifying the device and obtaining the device information corresponding to the device, the cloud server 40 directly delivers the device information to the terminal 20 and the terminal 30. The terminal 20 does not need to forward the device information, thereby reducing workload of the terminal 20.

In one case, after receiving a data model of an air conditioner, the terminal 30 virtualizes, on the terminal 30 based on selection by the terminal 20, an air conditioner remote control matching the air conditioner. The virtual air conditioner remote control is the same as a real air conditioner remote control, and includes buttons such as a virtual "ON/OFF" button used to control startup or shutdown of the air conditioner, and virtual buttons "−" and "+" used to control a temperature of the air conditioner. The terminal 20 sends the displayed air conditioner remote control to the terminal 30, and user B corresponding to the terminal 30 can operate a button of the air conditioner remote control on the video screen.

In this case, when user B operates the button of the air conditioner remote control on the video screen, the terminal 30 still presents a visual effect corresponding to the operation, and then sends the visual effect to the terminal in real time, so that user A can view an operation effect and learn an operation for controlling the target device 10.

In another case, after receiving a data model and a controllable configuration file of an air conditioner, the terminal 30 virtualizes, on the terminal 30 based on selection by the terminal 20, a virtual operation interface; used to control the air conditioner. The virtual operation interface includes buttons such as a virtual "ON/OFF" button used to control startup or shutdown of the air conditioner, and upward and downward virtual buttons used to control a temperature of the air conditioner. The terminal 20 sends the displayed virtual operation interface to the terminal 30, and user B corresponding to the terminal 30 can operate a button on the virtual operation interface.

Because the terminal 30 receives the controllable configuration file of the air conditioner, if user B operates a button on the virtual operation interface on the video screen, after generated operation information is sent to the terminal 20, the terminal 20 sends, based on an instruction for controlling the air conditioner of a controllable configuration file corresponding to the button, the instruction to the air conditioner in a transmission mode such as infrared, Wi-Fi, Bluetooth, or data traffic, to directly control the air conditioner.

Step 3: Party B performs a remote operation on the virtual operation panel, and records operation information such as coordinate information, a timestamp, and a quantity of taps.

User B corresponding to the terminal 30 performs an operation on the virtual operation interface, and the terminal 30 records operation information such as a coordinate point of a sliding operation, an operation time, a quantity of taps, and pressing duration in the operation process. After determining that user B completes the operation in the control process, the terminal 30 sends the recorded operation information to the terminal 20. In addition, a visual effect corresponding to the operation is presented on the virtual operation interface on the current video screen of the terminal 30. For example, a button is recessed downward as the user presses, and is recovered as the user raises the hand. The visual effect is also synchronized to the terminal 20, so that the user of the terminal 20 can intuitively see how to operate the remote control.

Step 4: After obtaining the operation information of party B, party A obtains, by parsing based on the operation information, a specific button operation such as turn on, turn off, turn up, turn down, or a channel.

After receiving and parsing the operation information sent by the terminal, the terminal 20 informs, in a manner such as video demonstration, user A of how to perform an operation on the terminal 20, to control the target device 10. In addition, a visual effect corresponding to the operation is presented on the virtual operation interface on the current video screen of the terminal 30. For example, a button is recessed downward as the user presses, and is recovered as the user raises the hand. The visual effect is also synchronized to the terminal 20, so that the user of the terminal 20 can intuitively see how to operate the remote control.

Smart Home Interconnection Phase:

Step 1: Party A controls the corresponding object based on the button operation.

In one case, the terminal 20 establishes a smart home interconnection protocol with the target device. After receiving the operation information sent by the terminal 30, the terminal 20 parses the operation information, converts the operation information into an instruction by using the smart home interconnection protocol, and sends the instruction to the air conditioner in a transmission mode such as infrared, Wi-Fi, Bluetooth, or data traffic. In this way, user A corresponding to the terminal 20 does not need to perform an operation again.

In another case, if the terminal 20 does not have an infrared emission function, or is not connected to the target device 10, or in other cases, the terminal 30 presents, on the virtual operation interface on the current video screen, a visual effect corresponding to the operation, and sends the visual effect to the terminal 20 in real time. By viewing the visual effect corresponding to the operation, the user corresponding to the terminal 20 can learn a method for operating and controlling the air conditioner, and then directly perform an operation on a physical object such as a physical remote control, a control panel on the target device 10, or a control device corresponding to the target device 10.

Figure 8:
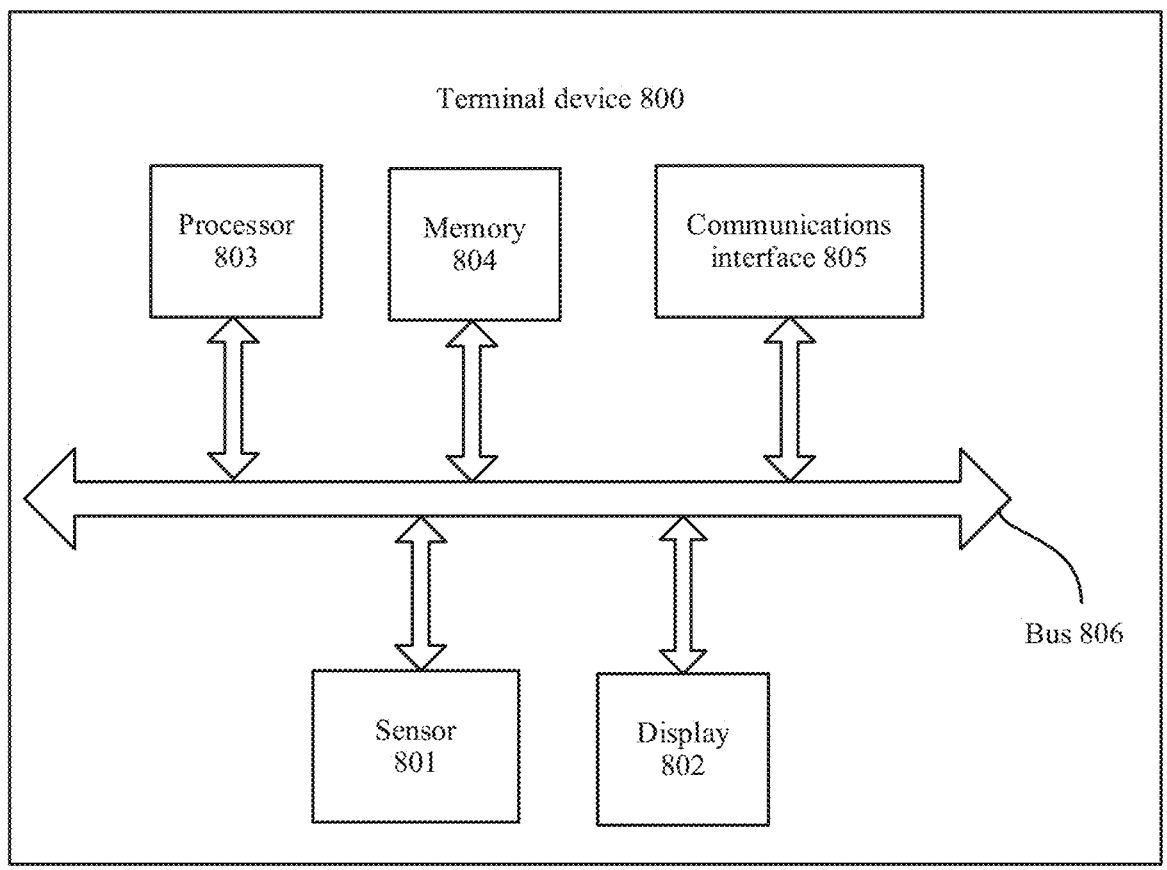
FIG. 8 is a schematic structural diagram of a terminal device according to an embodiment of the present invention.

FIG. 8 is a schematic structural diagram of a terminal device according to an embodiment of the present invention. The terminal device is configured to implement the foregoing method embodiments. FIG. 8 shows a terminal target device 800. The terminal target device 800 may be the terminal 20 or the terminal 30, and includes a sensor 801, a display 802, a processor 803, a memory 804, a communications interface 805, and a bus 806. The processor 803, the memory 804, and the communications interface 805 in the terminal device can establish a communication connection by using the bus 806.

The sensor 801 is configured to obtain a video stream including a device and device information corresponding to the device. The sensor 801 may include a camera or the like.

The display 802 is configured to display processed data, such as a video and a virtual operation interface.

The processor 803 may be a central processing unit (central processing unit, CPU).

The memory 804 may include a volatile memory (volatile memory), for example, a random access memory (random-access memory, RAM); or include a non-volatile memory (non-volatile memory), for example, a read-only memory (read-only memory, ROM), a flash memory, a hard disk drive (hard disk drive, HDD), or a solid stale drive (solid state drive, SSD); or include a combination of the foregoing types of memories.

The remote control methods provided in the foregoing embodiments are all performed by the processor 803. Data such as a video stream, device information, and operation information is stored in the memory 804. In addition, the memory 804 is further configured to store a corresponding program instruction or the like to be executed by the processor 803 to perform the remote control method in the foregoing embodiment.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

In addition, aspects or features in the embodiments of this application may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, or a flash memory (for example, an erasable programmable read-only memory (erasable programmable read-only memory, EPROM), a card, a stick, or a key drive). In addition, various storage media described in this specification may represent one or more devices and/or other machine-readable media for storing information. The term "machine-readable medium" may include, but is not limited to, a radio channel and various other media capable of storing, including, and/or carrying an instruction and/or data.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state drive, SSD)), or the like.

It should be understood that, in various embodiments of this application, sequence numbers of the foregoing processes do not mean execution sequences. The execution sequences of the processes should be determined based on functions and internal logic of the processes, and should not constitute any limitation on the implementation processes of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of the embodiments.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A method performed by a first terminal, wherein the method comprises:
    obtaining an image of a target device;
    sending, to a server, the image comprising the target device;
    receiving, from the server, device information corresponding to the target device;
    virtualizing, based on the device information, an operation interface, wherein the operation interface comprises a control interface of a control panel of the target device or a remote control of the target device;
    displaying the operation interface on a first video call screen on the first terminal during a video call between the first terminal and a second terminal, and synchronizing the operation interface on a second video call screen on the second terminal;
    receiving, from the second terminal, one or more operations performed on the operation interface on the second video call screen; and
    displaying, on the first video call screen, the one or more operations performed on the operation interface by a user of the second terminal.

2. The method of claim 1, further comprising binding the operation interface to the target device.

3. The method of claim 1, wherein displaying the operation interface comprises displaying the operation interface on or near the target device on the first video call screen, and wherein the operation interface is the control interface of the remote control.

4. The method of claim 1, further comprising:
    receiving, from the second terminal, a first operation; and
    sending, to the target device based on the first operation, a control instruction to control the target device.

5. The method of claim 1, further comprising:
    receiving a second operation performed by the user on the operation interface;
    displaying a visual effect corresponding to the second operation on the first video call screen; and
    synchronizing the visual effect to the second terminal.

6. The method of claim 5, further comprising sending, to the target device, a control instruction corresponding to the second operation to control the target device.

7. The method of claim 1, wherein displaying the operation interface comprises overlaying the control panel of the target device on the first video call screen with the operation interface, and wherein the operation interface is the control interface of the control panel of the target device.

8. The method of claim 1, wherein displaying the operation interface comprises replacing the control panel of the target device on the first video call screen with the operation interface, and wherein the operation interface is the control interface of the control panel of the target device.

9. A first electronic device, comprising:
    a memory configured to store instructions; and
    a processor coupled to the memory and configured to:
        obtain an image of a target device;
        send, to a server, the image comprising the target device;
        receive, from the server, device information corresponding to the target device;
        virtualize, based on the device information, an operation interface, wherein the operation interface comprises a control interface of a control panel of the target device or a remote control of the target device;
        display the operation interface on a first video call screen on the first electronic device during a video call between the first electronic device and a second electronic device, and synchronize the operation interface on a second video call screen on the second electronic device;
        receive, from the second electronic device, one or more operations performed on the operation interface on the second video call screen; and
        display, on the first video call screen, the one or more operations performed on the operation interface by a user of the second electronic device.

10. The first electronic device of claim 9, wherein the processor is further configured to display the operation interface on or near the target device on the first video call screen, and wherein the operation interface is of the remote control.

11. The first electronic device of claim 9, wherein the processor is further configured to overlay the control panel of the target device on the first video call screen with the operation interface, and wherein the operation interface is of the control panel.

12. The first electronic device of claim 9, wherein the processor is further configured to replace the control panel of the target device on the first video call screen with the operation interface, and wherein the operation interface is of the control panel.

13. The first electronic device of claim 9, wherein the processor is further configured to:
    receive, from the second electronic device, a first operation; and
    send, to the target device based on the first operation, a control instruction to control the target device.

14. The first electronic device of claim 9, wherein the processor is further configured to:

receive a second operation from the user on the operation interface;

display a visual effect corresponding to the second operation on the first video call screen; and synchronize the visual effect to the second electronic device.

15. The first electronic device of claim 14, wherein the processor is further configured to send, to the target device, a control instruction corresponding to the second operation to control the target device.

16. A method performed by a second terminal in a video call process between the second terminal and a first terminal, wherein the method comprises:

displaying a target device on a first video call screen on the second terminal;

receiving device information of the target device;

virtualizing, based on the device information, an operation interface, wherein the operation interface comprises a control interface of a control panel of the target device or a remote control of the target device;

displaying the operation interface on the first video call screen on the second terminal;

receiving a first operation performed by a user on the operation interface on the first video call screen;

displaying a visual effect corresponding to the first operation on the first video call screen on the second terminal; and synchronizing the visual effect to a second video call screen on the first terminal.

17. The method of claim 16, further comprising binding the operation interface to the target device.

18. The method of claim 16, wherein displaying the operation interface comprises displaying the operation interface on or around the target device on the first video call screen, and wherein the operation interface is the control interface of the remote control.

19. The method of claim 16, further comprising displaying, on the first video call screen based on data from the first terminal, one or more second operations performed on the operation interface by a user of the first terminal on the first terminal.

20. The method of claim 16, wherein displaying the operation interface comprises overlaying or replacing the control panel of the target device on the first video call screen with the operation interface, and wherein the operation interface is the control interface of the control panel.

* * * * *